United States Patent
Volkov (10) Patent No.: US 10,778,719 B2
(45) Date of Patent: Sep. 15, 2020

(54) SYSTEM AND METHOD FOR GATHERING INFORMATION TO DETECT PHISHING ACTIVITY

(71) Applicant: TRUST LTD., Moscow (RU)

(72) Inventor: Dmitry Aleksandrovich Volkov, Moscow (RU)

(73) Assignee: TRUST LTD., Moscow (RU)

(*) Notice: Subject to any disclaimer, the term of this patent is extended or adjusted under 35 U.S.C. 154(b) by 403 days.

(21) Appl. No.: 15/858,032

(22) Filed: Dec. 29, 2017

(65) Prior Publication Data

US 2018/0191778 A1 Jul. 5, 2018

(30) Foreign Application Priority Data

Dec. 29, 2016 (RU) .................. 2016152428

(51) Int. Cl.
*H04L 29/06* (2006.01)
*G06F 16/955* (2019.01)

(52) U.S. Cl.
CPC ...... *H04L 63/1483* (2013.01); *G06F 16/9566* (2019.01); *H04L 63/1416* (2013.01)

(58) Field of Classification Search
CPC ............ H04L 63/1483; H04L 63/1416; G06F 16/9566; G06F 21/50; G06F 21/55
See application file for complete search history.

(56) References Cited

U.S. PATENT DOCUMENTS

| | | | |
|---|---|---|---|
| 7,225,343 B1 | 5/2007 | Honig et al. | |
| 7,496,628 B2 | 2/2009 | Arnold et al. | |
| 7,712,136 B2 | 5/2010 | Sprosts et al. | |
| 7,730,040 B2 | 6/2010 | Reasor et al. | |
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,219,549 B2 * | 7/2012 | Gao | G06F 16/951 707/726 |

(Continued)

FOREIGN PATENT DOCUMENTS

| CN | 103491205 A | 1/2014 |
|---|---|---|
| CN | 104504307 A | 4/2015 |

(Continued)

OTHER PUBLICATIONS

Search Report with regard to the counterpart RU Patent Application No. 2018144708 completed Aug. 16, 2019.

(Continued)

*Primary Examiner* — Michael R Vaughan
(74) *Attorney, Agent, or Firm* — BCF LLP (57) ABSTRACT

A method for detecting phishing resources through collection of URL links. The method is executable by a web server and comprises receiving, by the web server, a query for obtaining an object hosted by the web server; extracting, by the web server, from the "Referer" field of the query, a URL link pointing to a query source; generating, by the web server, at least one converted URL link pointing to a different resource located on a same host as the query source, based on the extracted link; and sending the at least one converted URL link for a phishing analysis.

10 Claims, 4 Drawing Sheets

(56) References Cited

U.S. PATENT DOCUMENTS

| | | |
|---|---|---|
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1* | 3/2015 | Emigh ............... H04L 63/1483 726/25 |
| 9,026,840 B1 | 5/2015 | Kim |
| 9,060,018 B1 | 6/2015 | Yu et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,300,686 B2* | 3/2016 | Pidathala ............... G06F 21/562 |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario et al. |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2009/0138342 A1 | 5/2009 | Otto et al. |
| 2009/0281852 A1 | 11/2009 | Abhari et al. |
| 2009/0292925 A1* | 11/2009 | Meisel ............... H04L 63/1483 713/176 |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1* | 9/2010 | Mizrahi ............... H04L 63/1416 726/25 |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1* | 7/2019 | Peng .................. H04L 63/0838 |
| 2019/0373005 A1 | 12/2019 | Bassett |
| 2020/0134702 A1 | 4/2020 | Li |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |

(56) References Cited

FOREIGN PATENT DOCUMENTS

| | | |
|---|---|---|
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 15/707,641 dated Apr. 25, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Office Action with regard to the counterpart U.S. Appl. No. 16/261,854 dated Oct. 21, 2019.
English Abstract of RU107616 retrieved on Espacenet on Jul. 3, 2017.
European Search Report with regard to EP 17 19 1900 completed on Nov. 28, 2017.
European Search Report with regard to EP 17 19 1900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p. 210-218.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action with regard to the counterpart U.S. Appl. No. 15/858,013 dated Nov. 22, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", Infocom, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
European Search Report with regard to EP17180099 completed on Nov. 28, 2017.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—cited by Examiner in the Notice of Allowance with regard to the counterpart U.S. Appl. No. 15/707,641.
Office Action with regard to the counterpart U.S. Appl. No. 16/270,341 dated May 27, 2020.
Notice of Allowance with regard to the counterpart U.S. Appl. No. 15/858,013 dated Jun. 10, 2020.
Notice of Allowance with regard to the counterpart U.S. Appl. No. 15/858,013 dated May 8, 2020.

* cited by examiner

SYSTEM AND METHOD FOR GATHERING INFORMATION TO DETECT PHISHING ACTIVITY

CROSS-REFERENCE

The present application claims convention priority to Russian Utility Patent Application No. 2016152428, filed on Dec. 29, 2016, entitled "СИСТЕМА И СПОСОБ СБОРА ИНФОРМАЦИИ ДЛЯ ОБНАРУЖЕНИЯ ФИШИНГА". This application is incorporated by reference herein in its entirety.

FIELD OF THE TECHNOLOGY

The present technology relates to computers, particularly, to methods and systems for checking resources through gathering and converting URL links to detect phishing resources.

BACKGROUND

Due to rapid development of computer technologies and networks, the problem of detecting phishing services and resources, such as web web pages, Java applets, Flash applications, etc., along with their constituent parts (e.g. scripts, executable code and parts thereof, images and their parts, etc.), as well as phishing services, including software and applications for computing devices, including, but not limited to, mobile devices (cell phones, smartphones, tablets, laptops), PCs, servers, data storages, including, but not limited to, net-based data storages, such as SAN, NAS, etc. systems, LAN switches, Wi-Fi routers, hubs, etc., and other devices capable of processing and/or transferring data, is becoming increasingly important.

Phishing is a special form of Internet based fraud, particularly, the attempt to obtain sensitive data of the users, such as their logins, passwords, credit card details (PINs, expiry dates, CVV2/CVC2 codes, numbers, card holder names), phone numbers, code words, confirmation codes (e.g. for money transfers or payments), etc.

Phishing web resources are fake resources, i.e. fake web sites or pages, etc., that mimic the appearance of a known/original resource (a targeted web resource, i.e. a resource that may be targeted by various phishing activities). For instance, phishing (fake) web pages (Internet pages) may imitate the appearance of an original web page of a bank, an e-payment system, or a login page, etc., especially one that requires the user to input confidential or sensitive data, or some other information that is valuable for the user (their clients, friends, relatives, etc.) and/or offenders. These phishing web pages (or phishing web resources, in general) are created by the offenders (fraudsters) to obtain sensitive data of web site users/visitors.

The data collected through phishing (phishing attacks) may be then used by the offenders, e.g. in order to steal money from a credit card (specifically, through illegal withdrawal), or to extort money for restoring stolen logins and passwords (fraudsters change either part, so that the user is unable to access some web resource), or to extort money for keeping some valuable information secret, etc.

Links (web links, URLs, URIs, etc.) to phishing resources may be sent in text messages, a practice that is also known as "SMiShing". Also, links to phishing web resources may be contained in mailing lists, on various web sites, including social network pages, or in computer programs, such as office applications, including mobile (Android, iOS, etc.) applications.

Currently, links, particularly, web links (or any other data and information that can be analyzed for phishing) to be checked for possible phishing attacks may be obtained in different ways, e.g.:

through analysis of mail traffic (e.g. complete links in message body);

through analysis of web traffic using various services, software, etc. that are capable of registering URL addresses (web links), where Internet HTTP/HTTPS queries are directed;

through analysis of SMS/MMS traffic or messenger traffic. For instance, fraudsters can send messages telling the user to pay for fake services. For instance, such phishing offer may be contained in a message (or a link to that message from other devices, e.g. received from contacts that are known or unknown to the user) telling the user that their account has been blocked and that they have to follow the web link provided in the message (SMS/MMS). Or through analysis of domain names (e.g. addresses of web resources, web addresses, web sites, URIs, URLs, etc.) that are similar to popular web resources, brands, etc., so that users may mistake a fake resource for the real one. For instance, the original domain name "original-bankname.ru" may be substituted with a fake one, like original-bankname.tk, original-bankname.fake-do-mainname.es, original-banknameonline.pe.hu, original-bankname.online.hol.es, etc. Otherwise, veiled links may be used, including links to similar web resources.

The methods described above allow to detect, identify and/or somehow determine phishing resources directed against various brands, companies, web resources, etc. A possible difficulty, that arises when trying to detect a phishing resource or a phishing attack, is that the capability to view any type of traffic (e.g. HTTP traffic, email traffic, etc., i.e. information/data that has been sent and/or received) is limited. This limitation is usually caused by lack of access to the traffic. For instance, when there is lack of access to mobile traffic (data transferred over mobile/cellular networks), the phishing analysis system won't be able to see (or will only partially see) the phishing links, including web links, that are distributed over a mobile network. Also, traffic from some countries may be unaccessible. For instance, it is possible to analyze Russian traffic from Russia, but not U.S. traffic, therefore, it is difficult to detect phishing against U.S. brands.

Moreover, the methods described above may only detect phishing web resources, particularly, web sites, that compromise many various brands, but not phishing web resources directed against a specific brand. For example, it is necessary to detect/identify phishing activities against Brand 1. In this case, phishing detection system has to detect phishing activities against the given brand, particularly, web resources of that brand. The phishing detection system is capable of analyzing web traffic, SMS traffic, email traffic for Brand 2, Brand 3, Brand 4, etc., but this analysis is usually unable to detect phishing for Brand 1, or it may detect only traces of phishing activities, because of limitations described above.

In other words, when there is a need to detect phishing for Brand 1, various link sources (described above) may be analyzed, phishing resources for various brands may be detected, e.g. for Brand 2, Brand 3, Brand 4, etc., but not for Brand 1.

To facilitate the creation of phishing pages (particularly, web pages), Internet-based fraudsters use so-called phishing kits, i.e. a ready-made set of pages, scripts, configuration files, etc. that are customizable depending on what the offender intends to do with the information they obtain. Such fishing kits, like phishing web pages, may be created in such a way (and contain certain information/data), so that they allow loading web elements of web resources (e.g. phishing web resources, phishing scripts, phishing files, etc.) from official web resources (of e.g. payment systems, banks, terminals, network devices, etc.), such as images that may contain graphic elements, such as official logos, icons, animated elements (e.g. GIF animations, Flash animations, scripted or coded animations, etc.), scripts, script parts, animations, executable code or parts thereof, etc.

There are conventional methods and technologies for detecting phishing web resources by analyzing URL addresses through URL masks (the URL being Uniform Resource Locator/Universal Resource Locator), or by analyzing domain names with key words, or by checking whether there are contents that are loaded from official web sites, or by checking whether there are images characteristic for a certain brand, and including the web resource reputation. Such methods and technologies for countering phishing, Internet-based fraud and illegal access to sensitive information of users (visitors of web pages or users of applications, including mobile applications), and, particularly, methods and technologies for detecting phishing web pages may further comprise determining of domain name registration date (as well as its expiration date), or calculating hash values of web pages and comparing them to hash values that have been calculated earlier. Hash value (hash code, or simply hash) is a result of processing data with a hash function. A hash function is a function for translating an input array into a bit string of a fixed length using a given algorithm.

In order to evade detection by the methods described above, Internet-based fraudsters perform the following:
  they place their phishing web pages on compromises web sites with good reputation and domain history, so that they are able to sidestep the phishing detection methods that are based on checking the web resource reputation and history;
  they create URI paths (URI—Uniform Resource Identifier/Universal Resource Identifier) to phishing pages that do not mention the brand, or the name of the company/system, which allows them to sidestep the phishing detection methods that are based on the analysis of URL addresses by masks;
  they create phishing web pages with dynamic contents, so that these cannot be detected by calculating and comparing hash values.

Therefore, based on the analysis of the related art and technical capabilities, there is a need in the field for a method and system for detecting phishing resources in order to prevent phishing attacks.

SUMMARY

The objective of the present technology is detection of phishing resources through collection, transformation and transfer of URL links for phishing analysis in order to prevent fraudsters from accessing user information.

In accordance with a first broad aspect of the present technology, there is provided a method for detecting phishing resources through collection of URL links, the method executable by a web server. The method comprises:
  receiving, by the web server, a query for obtaining an object hosted by the web server;
  extracting, by the web server, from the "Referer" field of the query, a URL link pointing to a query source;
  generating, by the web server, at least one converted URL link pointing to a different resource located on a same host as the query source, based on the extracted link; and
  sending the at least one converted URL link for a phishing analysis.

The method of claim 1, wherein the "Referer" field of the query is extracted from a web server's event log.

In some embodiments of the method, the generating the at least one converted URL link comprises using a folder tree of the web resource.

In some embodiments of the method, the generating the at least one converted URL link comprises at least one of: determining paths contained in the URL link and adding at least one name of at least one resource that is hosted on the web resource.

In some embodiments of the method, the object is an image, a script, a web page, a Java applet, a CSS file, a text file, an XML file, a PHP file, an HTML file, an HTMLs file, an ASP file, an ASPX file, a web document, and a file containing executable code for a computing device.

In some embodiments of the method, the path in the URL link points to folders on the web resource.

In some embodiments of the method, the at least one resource is a suspicious file.

In some embodiments of the method, the file names are obtained using file name masks.

In some embodiments of the method, the folder names are obtained using folder name masks.

In some embodiments of the method, the file names are stored in at least one of a file name database, in a folder name database, or in a URL link database.

In some embodiments of the method, the folder names are stored in at least one of a folder name database or in a URL link database.

In some embodiments of the method, the generating the at least one converted URL link comprises determining folders that are contained on the web resource.

In some embodiments of the method, the web server's event log is accessed by one of:
  transferring the web server's event log to the server that collects and/or converts URL links; and
  providing remote access to the web server's event log for the server that collects and/or converts URL links.

In some embodiments of the method, the at least one converted URL link is stored in a URL link database.

A non-limiting embodiment of the present technology is a method for detecting phishing resources through collection of URL links that comprises the following steps: receiving an HTTP/HTTPS query for obtaining a resource located on a web server, by said web server; extracting a URL link referring to a query source from the "Referer" field of the query; generating at least one converted URL link referring to a different resource located on the same host, based on the extracted link; and sending the at least one converted URL link for phishing analysis.

In at least one non-limiting embodiment, the "Referer" field is contained in the web server event log.

At least one non-limiting embodiment further comprises using the folder tree of the web resource when generating converted URL links.

In at least one non-limiting embodiment, convertation of a URL link further includes determining paths in that link and/or adding names of resources that may be contained on the web resource.

In at least one non-limiting embodiment, the resource is an image or a script, or a web page, or a Java applet, or a CSS file, or a text file, or an XML file, or a PHP file, or an HTML file, or an HTMLs file, or an ASP file, or an ASPX file, or a web document, or a file containing executable code for a computing device, including files with compressed data.

In at least one non-limiting embodiment, the path in a URL link refers to folders that may be contained on the web resource.

In at least one non-limiting embodiment, resources contain names of files that may be used for phishing attacks on web resources.

In at least one non-limiting embodiment, file names are obtained using file name masks.

In at least one non-limiting embodiment, folder names are obtained using folder name masks.

In at least one non-limiting embodiment, file names are stored either in a file name database or in a folder name database, or in a URL link database.

In at least one non-limiting embodiment, folder names are stored either in a folder name database or in a URL link database.

In at least one non-limiting embodiment, convertation of a URL link further includes determining folders that may be contained on the web resource.

In at least one non-limiting embodiment, the web server's event log is accessed in any of the following ways: by transferring the web server's event log to the server that collects and/or converts URL links; or by providing remote access to the web server's event log for the server that collects and/or converts URL links.

In at least one non-limiting embodiment, converted URL links are stored in a URL link database.

BRIEF DESCRIPTION OF THE DRAWINGS

The objects, features and advantages of the technology will be further pointed out in the detailed description as well as the appended drawings. In the drawings.

DETAILED DESCRIPTION OF THE PREFERRED EMBODIMENTS

Objects and features of the present technology, methods for achieving these objects and features will become apparent by reference to the non-limiting embodiments. However, the present technology is not limited to the non-limiting embodiments disclosed below, it may be embodied in various forms. Summary contained in the description, is nothing but specific details secured to aid those skilled in the art in a comprehensive understanding of the technology, and the present technology is only defined within the scope of the appended claims.

Figure 1:
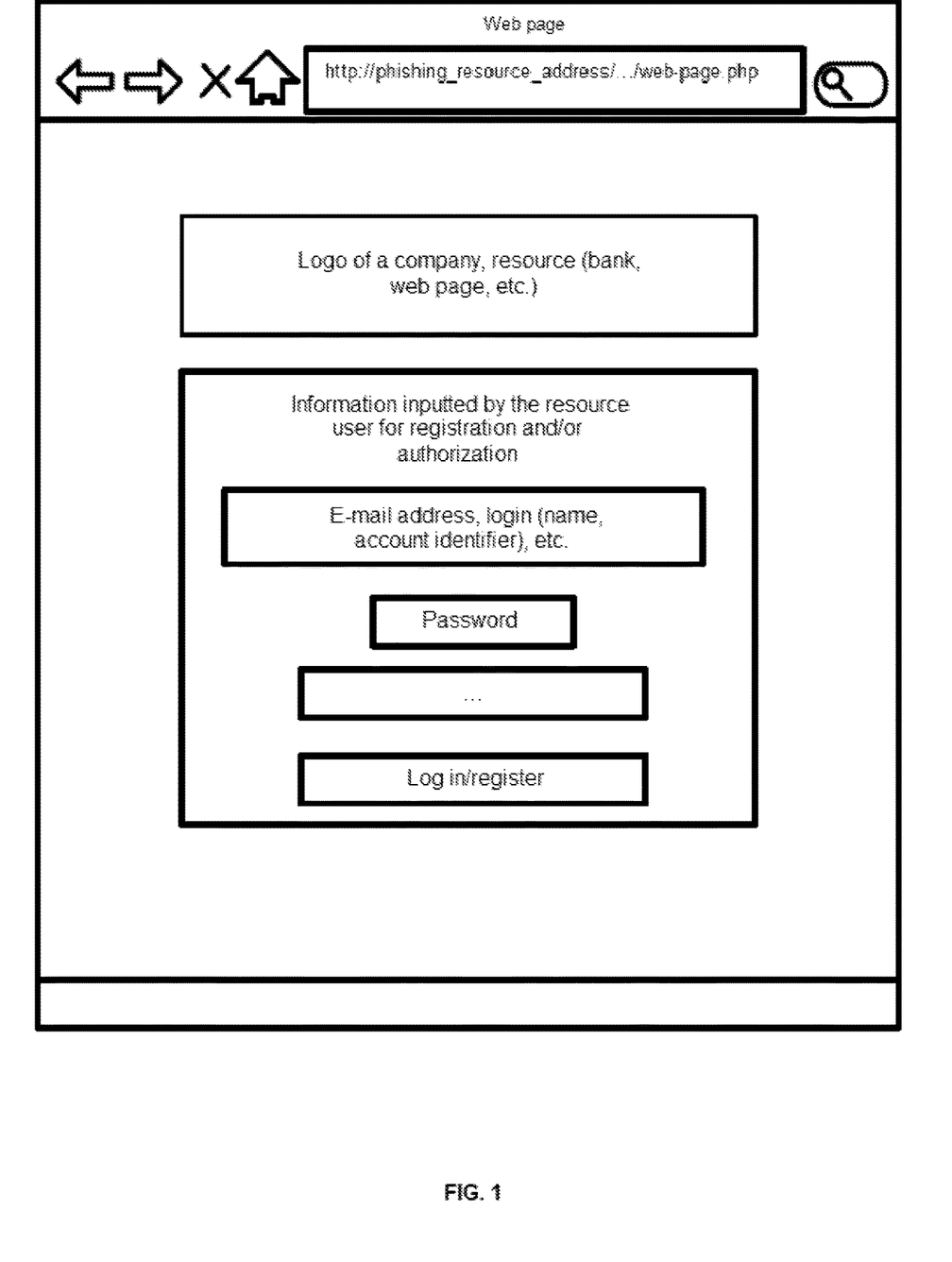
FIG. 1 depicts an example of a phishing web page, in accordance with non-limiting embodiments of the present technology.

FIG. 1 depicts an example of a non-limiting embodiment of a phishing web page that mimics a web page of a company, brand, etc., e.g. of an e-payment, bank transaction, etc. system. Links/web links (URLs, URIs, etc.) to web resources that need to be checked for phishing, along with phishing web resources (including suspicious web-resources, e.g. those frequently addressing the web server, the resources of which has been identified as phishing ones), may be received for analysis in different ways. In particular, such links may be received, e.g. from the log(s) of the server/web server (logs are created by the server 310—see FIG. 3—for web resources hosted by said web server, and are stored on said web server or in a data storage associated with it), particularly, log files of a web server.

URL is Uniform Resource Locator, which is the standardized way of presenting resource addresses in the Internet. An example of the URL entry: «<scheme>://<login>:<password>@<host>:<port>/<URL-path>?<parameters>#<anchor>», where «scheme» is a way of addressing the resource, mainly the network protocol, such as HTTP, HTTPS, FTP, etc.; «login» is the user's name used to access the resource; «password» is the password of a given user; «host» is a full domain name of the host in the DNS system, or its IP address containing four groups of decimals (integers ranging from 0 to 255), separated by dots; «port» is the host's connection port; «URL-path» (or simply a path) is specifying information on resource location and depends on the protocol used; «parameters» include a query string that contains parameters which are sent to the server with the GET method, wherein the string begins with the «?» symbol, and parameters are separated by «&», e.g., «?parameter1=value2&parameter2=vlaue3&parameter3=value1»; and «anchor» is the anchor's identifier with the preceding «#» symbol. The anchor may be a heading inside the document/web document, or the id attribute of an element that is used by the web browser to open some web page and focus the browser window on the anchored position.

It should be noted that log files, web server logs and other files may be transferred (e.g. via e-mail, FTP/HTTP protocol, instant messaging service, or network/cloud-based data storages, etc.) from the web site's web server to the server that implements the method of the present technology as files or data streams, packets, etc. Files that contain web links received by the server that implements the method of the present technology are not necessarily stored on the web site's web server, but they may be stored in any data storage, which is connected to the web site, particularly, to its web server, e.g. via the Internet, a LAN connection or in any other way.

Log files and other data containing web links to be converted (modified, particularly, web links containing paths and their extensions referring to files stored on a web resource), as described herein, may be accessed remotely, e.g. through folders/directories with common access, remote access software, including VPN (Virtual Private Network) connections to the web server containing data with web links mentioned herein. The server's log, particularly, that of a web server, is the list of entries on events happening on a computing device, e.g. user's device, or on the brand/company/etc. server, e.g. in a chronological order.

Log files of the server are files that may store information/data, operations and/or actions of the user, operator, software developer, as well as events of programs that are installed on the server or associated with it, and also services that are running on the server or are executed by it.

The server's log may consist of several such logs, wherein each log may be stored in a separate file or a set of files that are stored, e.g. on the server and/or user's device, or remotely. It may also be possible to encode and compress the data of such logs.

Below is an excerpt of an example of an HTML code of a phishing web page:

content="name=My Account;action-uri=https://www.original_brand.com/us/cgi-bin/webscr?cmd=_account;icon-uri=http://www.original_brandobjects.com/en_US/i/icon/pp_favicon_x.ico">»), it can be seen that the image (an icon, in this case) titled "pp_favicon_x.ico" is loaded (i.e. there is the code that loads the image, in this example—the icon) from the official web site of the brand on the original_brandobjects.com domain.

When a phishing web page is visited from the official web resource (e.g. a web site) of the brand (original_brandobjects.com), the image titled pp_favicon_x.ico is loaded. It should be noted that when web resource elements (e.g.

«
```
<!DOCTYPE htmL><!--[if Lt IE 9]>
<html lang="en" class="no-js lower-than-ie9 ie">
    <![endif]--><!--[if Lt IE 10]>
    <html lang="en" class="no-js lower-than-ie10 ie">
        <![endif]--><!--[if !IE]-->
        <html class=" js " lang="en">
<!--<![endif]-->
<head>
    <!--Script info: script: node, template: , date: Jul 3, 2016 17:28:47 -
07:00, country: US, language: en web version: content version: hostname :
ZwH608DcwsYoOOw3X9ttiQNSFeOd/u8Zrb0P3KkXCPH7QG/e6L9tFqD1LMrJGDcb+Pwa+
84YXcs                    rlogid                    :
Or6hBsNkVrwHgJBCMZPkpI71eI5V%2BYu%2FvV5zMKXQ7ei%2BiGynZVMPA078yW
crA9AQYZ%2FUQOdmpV1JR4dFKDFovY%2BW0Sl4yke8_155b34eb395 -->
    <meta charset="utf-8">
    <title>Log in to your original_brand account</title>
    <meta http-equiv="content-type" content="text/html; charset=UTF-8">
    <meta name="application-name" content="original_brand">
    <meta    name="msapplication-task"    content="name=My
Account;action-uri=https://www.original_brand.com/us/cgi-bin/webscr?cmd=_account;icon-
uri=http://www.original_brandobjects.com/en_US/i/icon/pp_favicon_x.ico">
    <meta    name="msapplication-task"    content="name=Send
Money;action-uri=https://www.original_brand.com/us/cgi-bin/webscr?cmd=_send-money-
transfer&send_method=domestic;icon-
uri=http://www.original_brandobjects.com/en_US/i/icon/pp_favicon_x.ico">
    <meta    name="msapplication-task"    content="name=Request
Money;action-uri=https://personal.original_brand.com/cgi-bin/?cmd=_render-
content&content_ID=marketing_us/request_money;icon-
uri=http://www.original_brandobjects.com/en_US/i/icon/pp_favicon_x.ico">
    <meta name="keywords" content="transfer money, email money
transfer, international money transfer ">
    <meta name="description" content="Transfer money online in seconds
with original_brand money transfer. All you need is an email address.">
    <link             rel="shortcut             icon"
href="https://www.original_brandobjects.com/en_US/i/icon/pp_favicon_x.ico">
    <link                     rel="apple-touch-icon"
href="https://www.original_brandobjects.com/en_US/i/pui/apple-touch-icon.png">
    <meta name="viewport" content="width=device-width, initial-
scale=1.0, maximum-scale=1, user-scalable=yes">
    <link                     rel="stylesheet"
href="https://www.original_brandobjects.com/web/res/dd1/3776a01d8c6d0e1d251f0de8e5e55/
css/app.css">
    <!--[if lte IE 9]>
    <link                     rel="stylesheet"
href="https://www.original_brandobjects.com/web/res/dd1/3776a01d8c6d0e1d251f0de8e5e55/
css/ie9.css" />
    <![endif]--><script
src="https://www.original_brandobjects.com/web/res/dd1/3776a01d8c6d0e1d251f0de8e5e55/
js/lib/modernizr-2.6.1.js"></script><script>/* Don't bust the frame if this is top window* or
if the parent window is *.original_brand.com domain (Checkout for example).*/if (self ===
top || /original_brand\.com$/.test(window.parent.location.hostname)) {var antiClickjack =
document.getElementById("antiClickjack");if           (antiClickjack)
{antiClickjack.parentNode.removeChild(antiClickjack);}}  else  {top.location  =
self.location;}</script><script    src="https://c.original_brand.com/webstatic/r/fb/fb-all-
prod.pp2.min.js"   data-requiremodule="https://c.original_brand.com/webstatic/r/fb/fb-all-
prod.pp2.min.js"    data-requirecontext="_"    async=""    charset="utf-8"
type="text/javascript"></script>
</head>
```
»

In the example of the HTML code of a phishing web page above («<meta name="msapplication-task" images, scripts that are located on web resources or associated with them) are cached, that image may not be necessarily loaded from the official web resource of the brand, it may be loaded from cached data. Yet, in order to cache the image, it must have been called at least once, e.g. the user must have visited the phishing web page, or the user's web browser, application, etc. must have loaded this image (which is located, e.g. on the official/original web resource or on an associated web resource) at least once.

On at least one query (call) of the image, the query being from a phishing web resource or an application, a web resource, etc., associated with phishing activities, the address of the web resource (particularly, a web page) making that query (call) for the image may be registered/detected. Such query (call) of the image may be made through a web link, URI, URL, etc., or by getting an instruction and/or to load the image, or by getting a query to access that image in a web browser, application, service (and/or other calls to the image made from the official brand, company, service, etc. of a web site/domain), etc., The address of the web resource (particularly, a web page) making that query (call) for the image may be registered/detected in a log (as described herein), e.g. a company web server's log, wherein the server is located on an official domain original_brandobjects.com. For instance, the address of the web resource hosting said image may be written in the "Referer field" of the web server's log.

It should be noted that the image (both access to it and links to it, etc.) is used as an example, as other components (objects) may also be called, loaded, executed, displayed, such as scripts (Java scripts), CSS files, PHP code/files, XML files, HTML files, ASP files, ASPX files, web documents, files containing executable code, including compressed data files, etc.

It should also be noted that the image in question does not necessarily have to be fully loaded and displayed in the user's browser. At least one non-limiting embodiment of the present technology may operate from a query addressed to that image. If the image was not loaded onto the user's device, the query will be registered in the event log, e.g. with an error code. For instance, the loading of the image may be blocked, e.g. by anti-virus software, but such block of loading of the image will not affect the registration of the query to that image.

In the HTTP protocol, the Referer (HTTP-Referer) field is one of the client query headers. This field contains the query source URL. If the Referer field is empty, it may mean that the user has printed the web resource address in the browser, or opened a favorite page (a page from "favorites"), or followed an inactive link in text, or a preceding page had its referer meta tag as "none" or "never", or followed from an HTTPS page with the referer meta tag to an HTTP page, or followed a link with the attribute rel="noreferer", or followed from a redirecting page, or the user uses a browser or a plug-in that returns an empty/modified Referer. Thus, the web site that has sent a query for some component (e.g. an image, a script, etc.) of the web server (that has an event log that registers all queries to server elements) may conceal itself as a query source. It should be noted that fraudsters may deliberately change the address in the Referer field.

The web link (e.g. a URL) referring to the source of the query addressed to a targeted web resource (a targeted web server, e.g. web server of a bank, web server of payment system, etc.) is sent from the suspicious (potential phishing) web server (the server to be checked for phishing, i.e. one that is possibly associated with phishing activities), e.g. through the POST method:

```
«
POST /send-message.html HTTP/1.1
Host: wewbsite_tobe_checked.com
Referer: http://website_tobe_checked.com/index.php
...
».
```

The string «Referer: http://website_tobe_checked.com/index.php» sends a web link to the targeted web resource, wherein that link will be entered in the Referer field of the targeted web resource log file.

It should be noted that the GET method or other methods of transferring to the targeted web resource (receiving by the targeted web resource) of a web link, that has queried the contents/elements of the web resource, may be used instead of the POST method.

When switching from one resource to another (e.g. from one web page to another web page), the Referer field will still contain the address of the first web page.

An example of a string from the web server's log may be:

```
«79.28.43.25   -   -   [25/Dec/2016:13:18:02   +0000] "GET/
images/shared/icon_alert_sprite-2x.png HTTP/1.1" 200 14487 "http://www.
phishing-website.com/folder1/folder2/" "Mozilla/4.0 (compatible; MSIE
6.0; Windows NT 5.1; SV1)"»
, where:
«79.28.43.25»   is the IP address of the user, to whom the phishing
web page has been shown;
«[25/Dec/2016:13:18:02 +0000]»   are date and time, when the
phishing web page has been shown;
«GET»   is an HTTP query method;
«/images/shared/icon_alert_sprite-2x.png» is a path to the icon on
the official server;
«HTTP/1.1» is the HTTP protocol version;
«200» is the web server's response code;
«14487»   is the size of the uploaded icon;
«http://www.phishing-website.com/folder1/folder2/»   is the address
of the source of the query of the image, icon, script, etc. , i.e., in this
example, the address of the phishing web resource;
«Mozilla/4.0 (compatible; MSIE 6.0; Windows NT 5.1; SV1)»   is the
version of the browser of the user that has visited the phishing web page.
```

The code provided above is an example and may contain various information, including information about the source (e.g. web server referred to by the link from the Referer field) that has sent a call to the image (located on the original source), and it also may be written in any information storage format and in any programming language, in text format, etc.

After the system has received the link from the Referer field, referring to the image-containing web resource to be analyzed for phishing (in this example: http://www.phishing-website.com/folder1/folder2/), the link may be used for such phishing analysis. That is, the link may be used to check whether the web resource (it was redirected from) is associated with phishing activities.

However, it is not always possible to detect phishing and/or to establish that a given web resource («phishing-website.com», in this example) is associated with phishing activities, based on just one web link that has been obtained and stored in the Referer field, the link containing the path (URL, URI, etc.) like http://www.phising-website.com/folder1/folder2/ (i.e. without mentioning the file called by the targeted web resource) or like http://www.phishing-website.com/folder1/folder2/index.php (i.e. mentioning the file called by the targeted web resource), since fraudsters may use web pages that are connected with each other, including possible loading of a page that informs the user of an error, e.g. "Wrong account data", etc.

For instance, a phishing kit, a phishing web resource, a phishing web page, etc. may inform the user of an error on the web page, a mistake in input fields, after which they may redirect the user to other web pages, web resources, and/or automatically display new contents (particularly, web page contents) or updated contents to the user, including performing various scripts, wherein the call to the official image may be located on both the first and the last pages in this sequence of user redirection through web resources, particularly, web pages. For instance, the user may visit the web page "exemplary_website.com/scroe.php" that would demonstrate the following exemplary text: "If you want to recharge your credit card balance, please press the button below." Below, there would be the "Recharge the credit card" button. At the same time, such web page may contain no image that has been loaded from the targeted web resource (web site of a bank, payment system, etc.). After pressing the button, the user may be re-directed to a page "exemplary_website.com/pay.php" of the same web site (or a page of another web site, e.g. "another_exemplary_website.com/pay.php") that may contain images from the targeted web resource and fields to be filled out by the user, namely: credit card number, PIN, account number, etc., which may be then used by fraudsters. Therefore, the Referer field of the log file of the targeted web resource will contain the link another_exemplary_website.com/pay.php as the source of the query to the image stored on the targeted web resource. Thus, this link will be processed for phishing, according to the method of the present technology.

It should be noted that the web site "exemplary_website.com/pay.php" may also contain the image from the targeted web resource that has been loaded on that web site using the web link pointing to the targeted web resource. In this case, the log file of the targeted web resource will register two calls to the target web resource, wherein the first Referer field will contain exemplary_website.com/pay.php, while the second Referer field will contain another_exemplary_website.com/pay.php. Thus, in this case, both these links will be processed in order to detect phishing web resources, according to the method of the present technology.

It should be noted that the system of the present technology may further comprise storing trusted names of domains and sub-domains in a data storage, e.g. in RAM (Random Access Memory), on the hard drive of the web resource or server implementing the method of the present technology, or other data storage devices, wherein such trusted names may be stored in databases, in text format, etc. The stored trusted names of domains and sub-domains may be used to filter entries in Referer fields in the web resource log file, in order to tell apart which web links will be processed by the system of the present technology, and which won't. For instance, "bank_website.com" is the targeted web resource, and its trusted domain and sub-domain names are "bank_website.com" and "subdomain.bank_website.com" correspondingly. If the Referer field in the log file of "bank_website.com" contains web links "bank_website.com/pay.php" or "subdomain.bank_website.com/pay.php", they won't be processed by the system of the present technology. And if the Referer field in the same log file contains web links «not_bank_website/pay.php» or «subdomain.not_bank_website/pay.php», they will be processed by the system of the present technology and will be further analyzed for phishing.

It should be noted that a web link from the Referer field may point to a file (in the present disclosure, a file is a web document, a script, etc. that are located on a targeted web resource, i.e. one that contains the log file used for phishing web site detection), e.g. a web link (URL, URI, etc.) http://www.phishing-website.com/folder1/folder2/config-file.php points to the file config-file.php located in the folder2, sub-folder of folder1, sub-folder of the root folder of the website. In this case, such web link may be sent for phishing analysis, and also it may be reduced to a link that does not contain links to a file (i.e. the web link from the Referer field may be reduced, so that it points to the folder containing the file, but not to the file itself), particularly, by cutting the file name from the web link. For example, the link http://www.phishing-website.com/folder1/folder2/config-file.php may be reduced to look like http://www.phishing-website.com/folder1/folder2/. It should also be noted that web resources that are associated with phishing activities/phishing attacks may use several connected web pages, scripts, etc., which may not necessarily be located on the same web resource. Intermediary web pages, scripts, etc. utilized in phishing may contain no links to the original image, thus, links from such web page won't be registered in the server's log, particularly, in the Referer field.

Thus, if just one link is analyzed, particularly, one obtained from the Referer field, the system may return no phishing contents, or it will be one web page of a phishing package (phishing kit), based on which is would be very difficult to identify whether the web resource is used for phishing or associated with phishing attacks.

To minimize risks arising from using just one web link as described above and to increase the possibility of phishing detection, the web link obtained may be converted into several converted web links in order to identify (using services and/or software for identifying web resource association with phishing activities, e.g. through analysis of contents obtained through a plurality of web links) whether the web resource is associated with phishing activities. Each of these converted web links, a set of converted web links and/or converted web resource identifiers (i.e. web links obtained through the method described below) may be requested by, or sent to, anti-phishing software and/or service, and/or operator/user responsible for phishing checks, in order to check whether the web resource is associated with phishing activities and, in particular, whether software, links, etc. located on the web resource are associated with phishing activities, and also whether there is phishing-related contents in the code/scripts located on the analyzed web resource.

It should be noted that when converted web links are being checked, they may be checked either simultaneously or in sequence, i.e. until the check tells whether or not the analyzed links are associated with phishing activities. When checking for phishing, the system may return at least one phishing-related flag (event) that denotes the presence of phishing. Such event may contain additional information on whichever phishing type has been used, or whichever brand, web resource, company, etc. has been compromised.

It should be noted that phishing analysis of converted web links may be performed using various systems and methods, e.g. through analysis of contents of files referred to by converted web links, or through search of parts of contents of files referred to by converted, particularly, extended web links, that are similar to contents of phishing pages or phishing kits, or through comparing domain names of web sites referred to by converted (extended) web links to official domain names of brands of phishing web resources, or through checking of domain names in phishing web resource databases, etc.

The data obtained during checks of a set of converted web links may be stored, e.g. in a database, RAM, etc. for further analysis of other web resources and establishing connections with phishing web resources.

The process of converting of (web) links, described above and below, may be divided into two stages, which may be performed independently from each other.

The first stage includes at least analysis of the web link obtained and finding all possible folders in it. For instance, the web link (see above) «http://www.phishing-website.com/folder1/folder2/», which was obtained from the Referer field, has a root folder «phishing-website.com/», its sub-folder «folder1», located at «http://www.phishing-website.com/folder1/», and also «/folder2/», located at «http://www.phishing-website.com/folder1/folder2/», a sub-folder for «folded». Thus, one web link may be converted in several links (modified web links, which is one type of converted web links, particularly, containing path in their web addresses):

«http://www.phishing-website.com/»;
«http://www.phishing-website.com/folder1/»;
«http://www.phishing-website.com/folder1/folder2/»

It should be noted that locations of folders on the server (phishing web resource) and their names may differ and may be written in different ways using different character sets, including special symbols.

Then at least one web link from the resulting set of modified web links may be extended with names of files containing program code, e.g. scripts, web page layout code, etc., i.e. files that can be possibly hosted on a phishing resource, such as «index.php», «index.html», «index.htm», «login.php», «login.htm», «login.htm», «login.js», «Login-Verification.php», «reg.html», etc., with or without extensions (as well as files containing HTML, PHP, etc. code that may be located in folders and sub-folders of web resources, particularly, phishing web resources), i.e. names of frequently used files that are needed for web site operation.

Therefore, the given set of web links (resulting from converting of at least one web link) «http://www.phishing-website.com/», «http://www.phishing-website.com/jfolder1/», «http://www.phishing-website.com/folder1/folder2/» may be extended with the information provided above, such as names of files (also referred herein as suspicious files) usually hosted by a phishing web resource.

Thus, script and file names (that may be potentially hosted on a web site) may be added, as mentioned above, to all folders of any level (e.g. possibly accessing the list of all folders and/or files on the phishing web resource), e.g. those defined in the original web link(s).

For instance, the original link given above «http://www.phishing-website.com/folder1/folder2/» may be converted into an extended web link, like:

for «http://www.phishing-website.com/»:
«http://www.phishing-website.com/index.php»;
«http://www.phishing-website.com/login.php»;
«http://www.phishing-website.com/LoginVerification.php»;
«http://www.phishing-website.com/index.html»;
etc.

for «http://www.phishing-website.com/folder1/»:
«http://www.phishing-website.com/folder1/index.php»;
«http://www.phishing-website.com/folder1/login.php»;
«http://www.phishing-website.com/folder1/LoginVerification.php»
«http://www.phishing-website.com/folder1/index.html»;
etc.

for «http://www.phishing-website.com/folder1/folder2/»:
«http://www.phishing-website.com/folder2/index.php»;
«http://www.phishing-website.com/folder2/login.php»;
«http://www.phishing-website.com/folder2/LoginVerification.php»
«http://www.phishing-website.com/folder2/index.html»;
etc.

As mentioned above, the web link may be analyzed not only up the folder tree, but also down that tree, e.g. folder3, folder4, etc. In this case, there may be a method for generating converted (modified and/or extended) web links, particularly, one listing potential names of files that may be hosted on a phishing web resource and/or associated with it, that is applied to child folders, including at least one folder that is a child to the root folder of the web site and its sub-folders.

It should be noted that after at least one folder has been identified in the link from the Referer field, its name may be used to create a folder mask (folder name mask) to search for similar folders on the web server (that has sent a query concerning the image). For instance, if the system has identified Folder1 (and/or Folder2) on the web site, it may then create a folder name mask, such as «Folder?» or «Folder*», where "?" can be replaced by any single symbol, and "*" can be replaced by any number of symbols. Other mask types are also possible. Such folder mask may be used to search for folders with similar names.

In order to search for similar files, the file mask (file name mask) may be used that is created in the same way as the folder name mask. A file name mask is a combination of special symbols that allows to massively search and select files based on common attributes, such as name type and/or similarity.

Instead of searching for frequently used files and/or folders on the web server (referred to by the link from the web resource log), or during that search, various file and/or folder masks may be used.

Such name masks may be utilized to generate file and/or folder names to add them to processed web links in order to find files to be submitted for phishing analysis or folders that may contain such files on the web site (referred to by the link from the Referer field).

Figure 2:
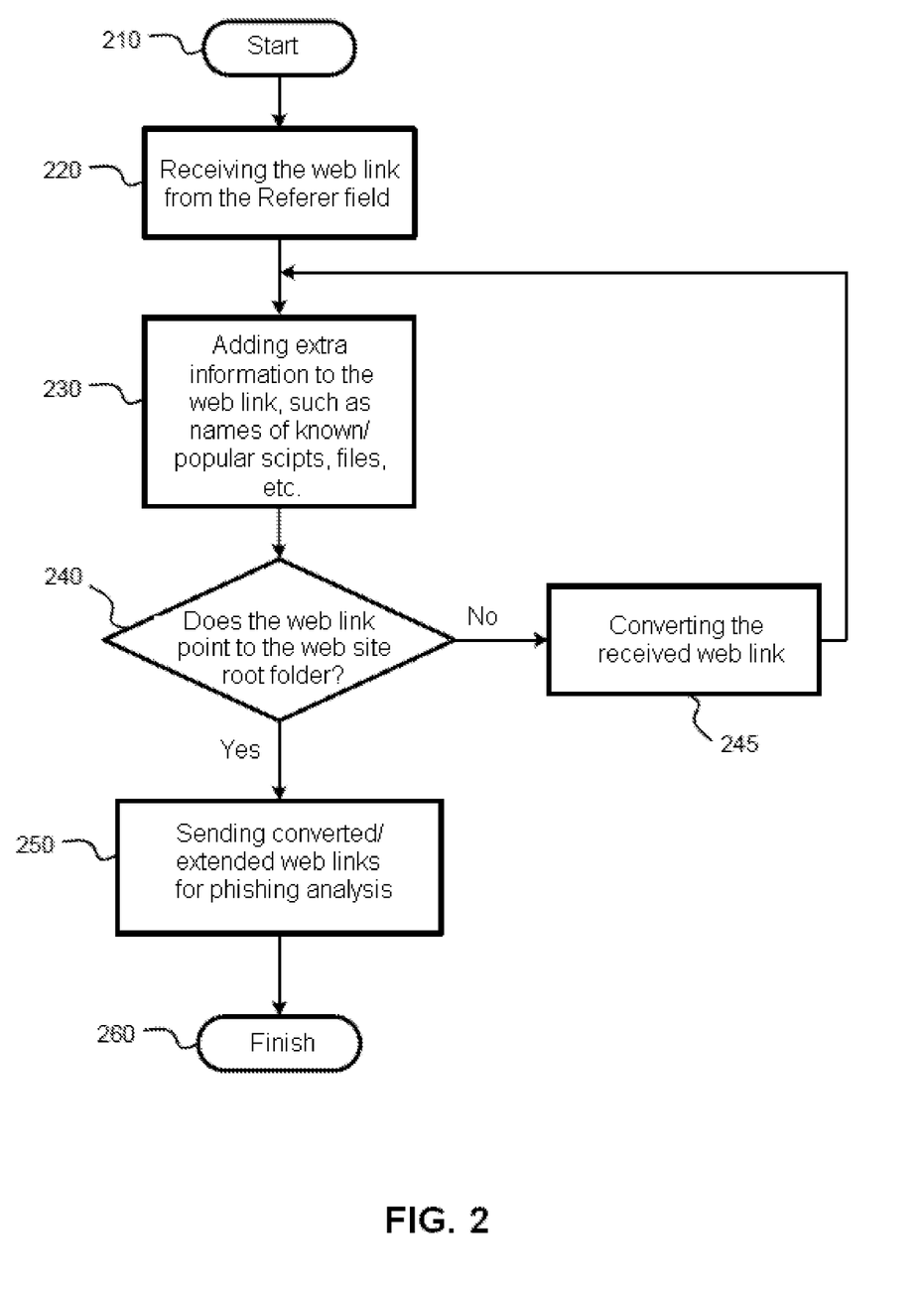
FIG. 2 depicts a block diagram of a flowchart of an implementation of information collection for phishing detection, in accordance with non-limiting embodiments of the present technology.

FIG. 2 depicts a block diagram of a flowchart for information collection for phishing detection. The information collection process starts at step 210. In step 220, the system receives a web link leading to a web resource (e.g. a phishing web resource, particularly, a phishing web site, e.g. one of its pages that may contain traces of phishing or be potentially associated with other phishing resources) from the Referer field of the server's event log.

At step 230, the web link is extended with information, as described above, particularly, names of files, e.g. standard files (default files created in folders and sub-folders of a web site) and/or frequently used files (particularly, by web servers, services, sites, etc.), which potentially may be located on the web server referred to by the web link, etc., which results in at least one extended web link (also referred to herein as "converted web link" or "converted URL link") or a set of extended web links.

Folder names of the folders that may be added to the web link, the web link being extracted from the Referer field, and/or a converted web link may be stored. The file names that may be added to the web link may also be stored, to generate an extended web link. Such stored folder names and/or file names may be extracted (taken from) from the storage of file names and folder names in order to be used for generating at least one extended web link.

Figure 3:
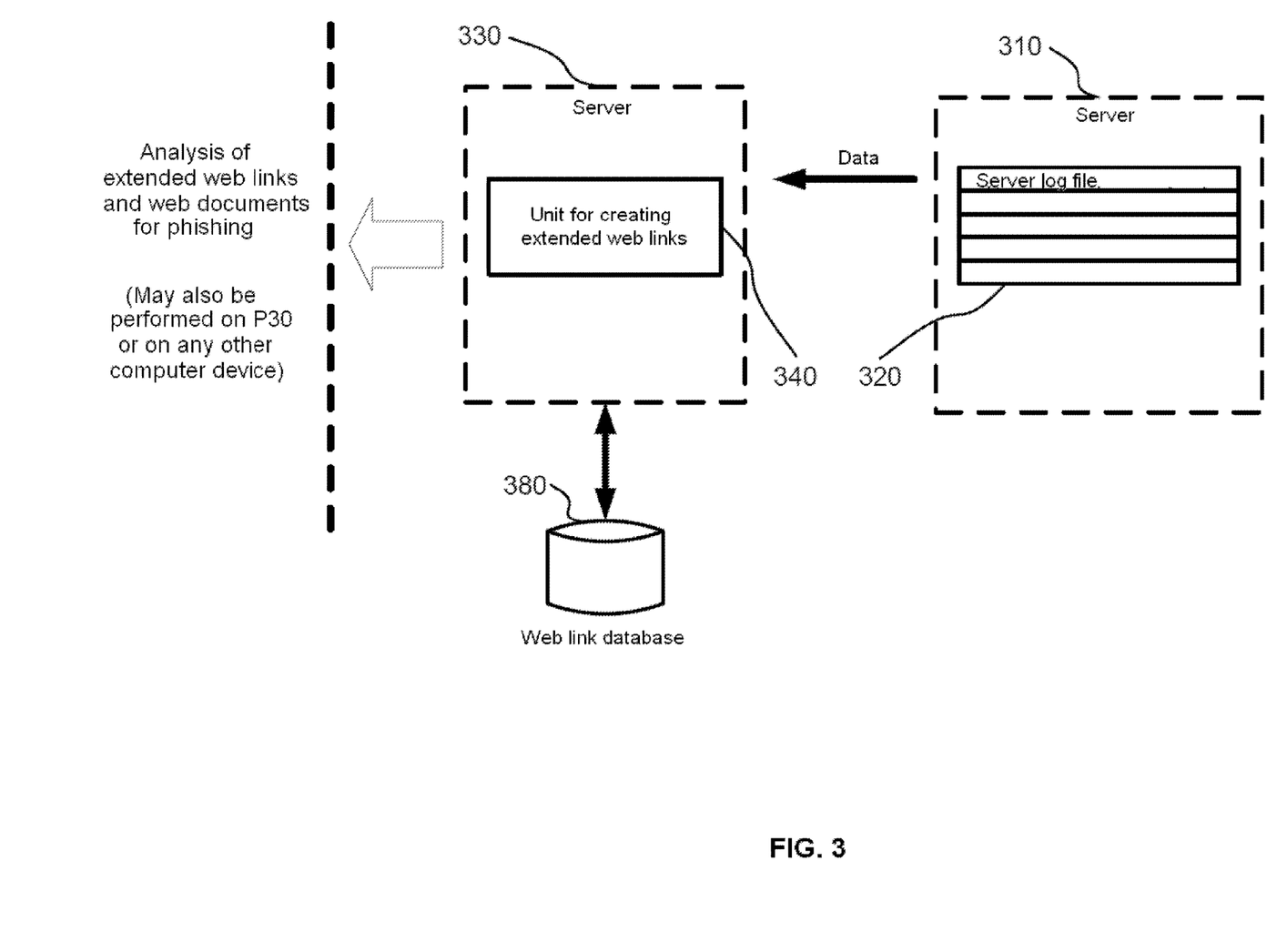
FIG. 3 depicts a schematic diagram of a system for detecting phishing resources, in accordance with non-limiting embodiments of the present technology.

Folder names and file names may be added to the data storage during the analysis of phishing web resources, phishing kits, and also from associated databases of the phishing web sites, phishing kits and phishing web pages. The data may be stored in RAM or on the hard disk of the web resource or server implementing the method of the present technology, e.g. the server 330 or the server 310, as well as on a Flash drive or other data storage devices, wherein file names and folder names may be stored in databases in text format or other formats.

As mentioned above, the web link from the Referer field may be converted into a web link that refers not to a file, but to a folder containing that file (listed in the full web link from the Referer field).

It should be noted that the set of files added to the web link may differ depending on path levels (level of folder referred to by the link). For instance, service folders of the web site, such as public_ftp, public_html, mail, tmp, cache, etc. may contain files with standard/default names (these files are usually created automatically, when using a web site design tool), such as about.php, admin.php, credits.php, 404.shtml, etc. In this case, it may be enough to extend the web link with standard file names only, which may be contained in those folders, excluding those that may be not contained there at all.

It should be noted that file names and extensions may differ depending on the operating system installed on the web server listed as the Referer. For instance, instead of the file «index.html» or «index.htmls» the web site may have the file «index.asp» or «index.aspx». Therefore, an extended web link may be created by adding file names with extensions that correspond to the operating system actually installed on the web server. The actual operating system may be determined using various software, means and methods, e.g. by interrogation of TCP/IP stack of the web server.

The resulting set of extended web links (or at least one extended web link) may be stored in the web link database, as described below, or in the RAM of the computer executing this process, before they are saved into the web link database or submitted for phishing analysis, as described below.

After step 230 is fulfilled, the process proceeds to step 240. In step 240, the process checks whether the obtained web link refers to the root folder of the web site.

If the web link has been found to refer to the root folder of the web site in step 240, the process proceeds to step 250, where the set of extended web links (or at least one extended web link) is submitted for phishing analysis, e.g. to an application for web link and file analysis, which is also capable of analyzing the source code of files.

It should be noted that after at least one extended web link has been received, it may be added to the web link database. Extended web links, that are stored in the extended web link database (web link database), may be further sent for phishing analysis.

It should be noted that before being stored in the extended web link database, those links may be analyzed for phishing. If the check finds out that the file referred to by the extended web link is associated with phishing activities, then the corresponding extended web link may be stored in the web link database (or a separate database for phishing web links/resources), with a remark that the link in question is associated with phishing activities (e.g. the file it refers to contains phishing code), like «phishing_resource_name com/index.php phishing-detected phishing-type phishing-aim compromised-brand», or it may just list the domain name of the phishing web resource, etc.

It should be noted that the extended link, domain name, phishing detection remark, brand name (e.g. bank, payment system, etc.), etc. may be added to the ending of a regular expression that has been created and, optionally, stored in a file, database, etc., or stored in RAM. Such regular expression may look like «http://bank_website_example.com/index.php <title>((Transfer\sfrom\scard)).*?bank-name.*\b-card-payment-creditcard bank-name, bank_website_example.com, bank-name-domain-name-.com, phishing-detected phishing-type phishin-aim compromised-brand», where «http://bank_website_example.com/index.php» is an extended web link; «<title>((Transfer\sfrom\scard)).*?bank-name.*?b-card-payment-creditcard» is a rule for searching for phishing in the web page code; «bank_website_example.com» and «bank-name-domain-name.com» are trusted domains of the web resource; «phishing-detected» is a remark telling that this web page has been identified as a phishing one; «phishing-type» is phishing type; «phishing-aim» is phishing aim; and «compromised-brand» is a brand, against which this phishing attack is directed.

It should also be noted that the data mentioned above may be represented by interconnected table cells. Such data may be stored in at least one database, in one or more tables of a database. For instance, when such data are stored in the same table, a rule may occupy one cell of that table, and at least one other cell corresponding to that one may store at least one value corresponding to the brand, domain name, phishing aim, etc. When phishing detection rules are stored in one table, and associated brands, domain names, etc. are stored in at least one other table (or the same one) of the same database or at least one other database, then cells in those tables may be connected, e.g. via links or any other database mechanism. For instance, one cell of one database table that stores the phishing detection rule may be linked to at least one cell of another database table that stores at least one extended web link, brand, domain name, phishing aim, etc. Also, one cell in the table of the special link database that stores the phishing detection rule may be linked to at least one cell in the table of the brand, domain name, etc. database that stores at least one brand, domain name, etc. A possible alternative is that a cell in the table of a brand, domain name, etc. database/databases is linked to at least one cell in the table of the phishing detection rule database that stores the rule.

If the check hasn't found that the extended web link is associated with phishing activities, that link may be not stored in the web link database, or it may be stored in the database for links that are not associated with phishing activities, or it may be stored in the extended web link database with a remark that this link is not associated with phishing activities, like «webresource_name com/index.php no-phishing» (or without any remark, which would show just the same).

It should be noted that extended web links may be sent for phishing analysis, e.g. to applications for checking such links (particularly, contents of the file referred to by the link), which is done at the same time while the system collects similar web links (information for phishing detection) to provide phishing analysis "on the fly".

It should be also noted that a set of extended web links (i.e. links referring to the same folder) may be sent for phishing analysis.

If it has been determined at step 240 that the web link refers to a folder other than the root folder of the web site, the process proceeds to step 245, where the web link is converted as described above. Particularly, it moves one level up in the web site catalog tree. It should be noted that the web link converting step may include moving up the folder tree of the web site (which may be further checked for phishing activities). For example, if the Referer field contains a web link «http://www.phishing-website.com/folder1/folder2/» referring to «folder2» (which is a sub-folder to «folder1»), then, one step of converting (moving up one level), will result in the «http://www.phishing-website.com/folder1/» link referring to «folder1» (which, in turn, is a sub-folder to the root folder of the web site). During the next step of converting, the resulting web link «http://www.phishing-website.com/folder1/» will be converted into «http://www.phishing-website.com/».

Switching through folders may be performed either automatically, using algorithms, or by the operator (a person, who is responsible for utilizing the method of the present technology). For instance, the system may determine the position of the last but one "/" or "\" (slash) symbol, or any other symbol that divides folders in the web link string (or corresponding ASCII codes). After that, all symbols following that divider (depending on the operating system installed on the web server from the Referer field) may be removed.

It should be noted that web link converting may include going down the catalog tree, if its structure is known. Otherwise, to go down the catalog/folder tree of the web site (or stay at the level referred to by the current web link), commonly used or standard folder names may be employed, such as /admin/, /config/, etc. It should also be noted that the system implementing the method of the present technology may comprise storing the names of such folders in at least one data storage, as described above.

After step 245 is fulfilled, the algorithm returns to step 230.

After step 250 is concluded, the process proceeds to step 260—the final step.

It should be noted that the steps of the method, e.g. steps 230, 240, 245 may be automated, e.g. through processing of data to be analyzed by computer systems (such computer devices/systems may include self-learning systems capable of processing data based on the initial input by the operator, such as initial data and data/link analysis and procession algorithms, in order to obtain a set of extended web links).

As mentioned above, extended web links may be stored, e.g. in a database, e.g. one that is connected to the extended web link creation unit, in RAM, e.g. of a computer system that is used as a base for creating extended rules, or of a device that has send the analysis query, or of a service that has requested the phishing/malware analysis, or also of devices, services and software that are connected to the devices that take part in requesting the analysis of data.

The steps of the information collection and phishing detection flowchart may be automated, e.g. through algorithms implementing the steps described (along with associated operations, as described in the present disclosure) with software that is executed on the computer device, particularly, the server 330 or the server 310.

FIG. 3 depicts a schematic diagram of a system for detecting phishing resources, in accordance with non-limiting embodiments of the present technology. As shown in FIG. 3, the system for detecting phishing resources comprises a server 310 (for collecting, analyzing and converting information for phishing analysis) that contains at least one server log file 320 (also referred herein as "event log"). Also, the system comprises a processing server 330 (or any other computing/computer device) to process data from the log file of the server 310. The processing server 330 for data processing comprises a unit that creates extended web links (converted URL links), extended web link creation unit 340, as described above.

Also, the system shown in the figure comprises a database 380 to store extended links. That the database 380 may be represented by a set of databases that are located on one or several computer devices, data storages, etc. Available data storage formats include, but are not limited to, tables, text documents, data sets, hash tables, B-trees, etc.

It should be noted that the processing server 330 may be substituted with the server 310, i.e. the server 310 may collect information for phishing analysis and an extended web link creation unit 340 may also be located on the server 310, while the database 380 may also be connected to the server 310. Therefore, the data to be analyzed for phishing may be not sent to the server 330. Therefore, the server 330 may be not necessary, so it may be removed from the system or used to forward data obtained during information collection for phishing analysis.

It should be noted that before the extended web links are stored in the extended web link database or before they are sent for phishing analysis, said links (at least one) may be checked in order to find out whether there is the file in the web server that is accessed by the given extended web link received from the Referer field. Such check, which is also a validity check of the extended web link (i.e. whether it accesses an existing file), may be run in different ways, e.g. by executing a PHP file with the get_headers( ) function on the server 330 that would return all headings from the web server, e.g. as the following array:

```
«
[0] => HTTP/1.1 200 OK
[1] => Date: Sat, 01 Dec 2016 11:11:11 GMT
[2]=> Server: Apache/1.3.27 (Unix) (Red-Hat/Linux)
[3]=> Last-Modified: Sat, 01 Dec 2016 10:10:10 GMT
[4]=> ETag: "11111-111-11111111"
[5]=> Accept-Ranges: bytes
[6]=> Content-Length: 111
[7]=> Connection: close
[8]=> Content-Type: text/html
» .
```

The zero element of this array contains response code 200, meaning that the requested file has been found on the server.

Below is an example of a code in PHP language that may be used to check whether there is an index.php file on the "website_tobe_checked.com" web server:

```
«
<?
$url = "http:/website_tobe_checked.com/index.php";// a link to the requested file
$Headers = @get_headers($url);
```

```
    if(strpos('200', $Headers[0]))//checking, whether there is a response code 200 in the
zero element of the array that has been returned by the server with the get_headers( ) function
      {echo "The file has been found on the web server";//The message is displayed, telling
that the requested file has been found
    //or, optionally, the requested file is added to the extended web link database or it is
sent for analysis in order to check whether it is associated with phishing activities
      }
      else {"The file has not been found on the web server";//The message is displayed,
telling that the requested file has not been found
    //or, optionally, the requested file is not added to the extended web link database or it
is sent for analysis in order to check whether it is associated with phishing activities
      }
      ?>
    ».
```

Figure 4:
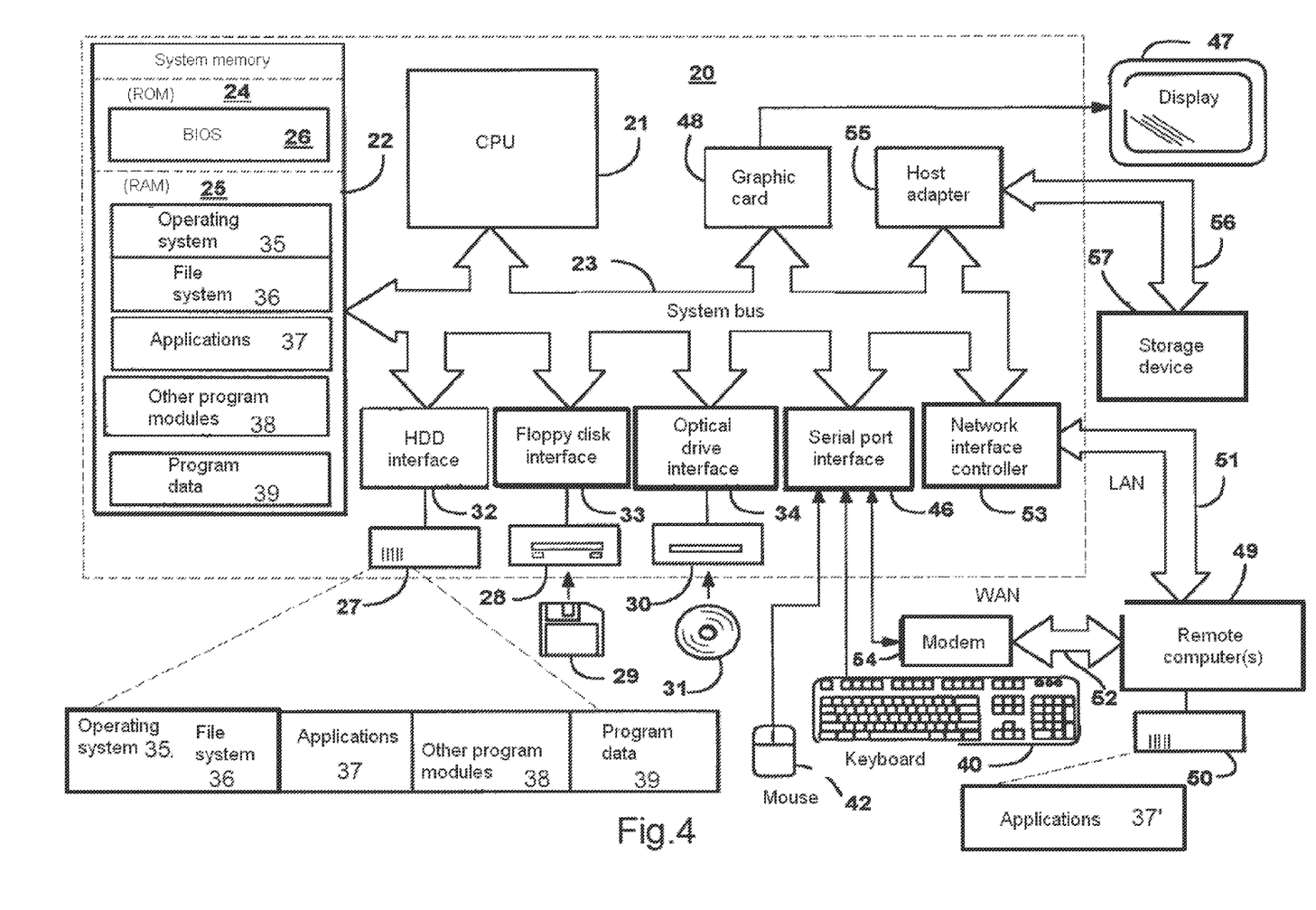
FIG. 4 depicts a schematic diagram of a computer system, in accordance with non-limiting embodiments of the present technology.

FIG. 4 depicts a schematic diagram of a computer system, in accordance with non-limiting embodiments of the present technology. The system comprises a multi-purpose computing device—a computer 20 or a server comprising a CPU 21, system memory 22 and system bus 23 that connects various components of the system to each other, particularly, the system memory to the CPU 21.

The system bus 23 can have any structure that comprises a memory bus or memory controller, a periphery bus and a local bus that has any possible architecture. The system memory comprises a ROM (read-only memory) 24 and a RAM (random-access memory) 25. The ROM 24 contains a BIOS (basic input/output system) 26 comprising basic subroutines for data exchanges between elements inside the computer 20, e.g. at startup.

The computer 20 may further comprise a hard disk drive 27 capable of reading and writing data onto a hard disk (not illustrated), a floppy disk drive 28 capable of reading and writing data onto a removable floppy disk 29, and an optical disk drive 30 capable of reading and writing data onto a removable optical disk 31, such as CD, video CD or other optical storages. The hard disk drive 27, the floppy disk drive 28 and optical disk drive 30 are connected to the system bus 23 via a hard disk drive interface 32, a floppy disk drive interface 33 and an optical disk drive interface 34 correspondingly. Storage drives and their respective computer-readable means allow non-volatile storage of computer-readable instructions, data structures, program modules and other data for the computer 20.

Though the configuration described herein uses a hard disk, a removable floppy disk 29 and a removable optical disk 31, a person skilled in the art would understand that an operating environment may also involve using other machine-readable means capable of storing computer data, such as magnetic tapes, flash drives, digital video disks, Bernoulli cartridges, RAM, ROM, etc.

Various program modules, including an operating system 35, may be stored on a hard disk, a removable floppy disk 29, a removable optical disk 31, in ROM 24 or RAM 25. The computer 20 comprises a file system 36 that is connected to or incorporated into the operating system 35, one or more applications 37, other program modules 38 and program data 39. A user may input instructions and data into the computer 20 using input devices, such as a keyboard 40 or a pointing device 42. Other input devices (not illustrated) may include microphone, joystick, gamepad, satellite antenna, scanner, etc.

These and other input devices may be connected to the CPU 21 via a serial port interface 46, which is connected to the system bus, but may also be connected via other interfaces, such as parallel port, game port, or USB (universal serial bus). A display 47 or other type of visualization device is also connected to the system bus 23 via an interface, e.g. a video adapter 48. Additionally to the display 47, personal computers usually comprise other peripheral output devices (not illustrated), such as speakers and printers.

The computer 20 may operate in a network by means of logical connections to one or several remote computers 49. One or several remote computers 49 may be represented as another computer, a server, a router, a network PC, a peering device or another node of a single network, and may comprise the majority of or all elements of the computer 20 as described above, though only a data storage device 50 is illustrated. Logical connections include both LAN (local area network) 51 and WAN (wide area network) 52. Such network environments may be implemented in various institutions, corporate networks, the Intranet and the Internet.

When used in a LAN environment, the computer 20 is connected to the local area network 51 via a net interface or an adapter 53. When used in a WAN environment, the computer 20 may operate through a modem 54 or other means of establishing connection to the wide area network 52, such as the Internet.

The modem 54 may be an internal or external one, and may be connected to the system bus 23 via a serial port interface 46. In a network environment, program modules or parts thereof as described for the computer 20 may be stored in a remote storage device. It should be noted that the network connections described herein as non-limiting embodiments, and communication between computers may be established through other means.

In conclusion, it should be noted that the details provided in the description are examples that do not limit the scope of the present technology as defined by the claims. A person skilled in the art would understand that there may be other embodiments that are consistent with the spirit and scope of the present technology.

What it claimed, is:

1. A method for detecting phishing web resources targeting a targeted web server through collection of URL links, the method being executable by a web server, the method comprising:

receiving, by the web server, a request for obtaining an object hosted by the targeted web server;

accessing, by the web server, an event log of the targeted web server to extract, from a "Referer" field of the request, a recorded URL link associated with a suspicious web resource, the recorded URL link pointing to a first directory hosted by the suspicious web resource;

generating, by the web server, based on the recorded URL link, a plurality of converted URL links associated with the suspicious web resource, each one of the plurality of converted URL links pointing to a respective directory hosted by the suspicious web resource, the respective directory being different from the first directory;

for each one of the plurality of converted URL links, retrieving, by the web server, a predetermined list of filenames for generating a respective plurality of extended URL links, each one of the respective plurality of extended URL links pointing to a respective suspicious web resource file hosted by the suspicious web resource in the respective directory;

in response to determining that the respective suspicious web resource file exists at the suspicious web resource, retrieving, by the web server, the respective suspicious web resource file for analyzing a content thereof for phishing;

in response to the analyzing rendering a positive result:

identifying the suspicious web resource as a phishing web resource targeting the targeted web server;

storing each one of the plurality of extended URL links in an extended URL link database to be used to identify other phishing web resources.

2. The method of claim 1, wherein the generating the plurality of converted URL links comprises using a folder tree of the suspicious web resource.

3. The method of claim 1, wherein the generating the respective plurality of extended URL links comprises at least one of: determining paths contained in the recorded URL link and adding, from the predetermined list of filenames, at least one filename of at least one resource that is hosted on the suspicious web resource.

4. The method of claim 3, wherein the object is one of an image, a script, a web page, a Java applet, a CSS file, a text file, an XML, file, a PHP file, an HTML file, an HTMLs file, an ASP file, an ASPX file, a web document, and a file containing executable code for a computing device.

5. The method of claim 1, wherein a name of the respective directory is obtained using folder name masks.

6. The method of claim 5, wherein the name of the respective directory is stored in at least one of a folder name database and in a URL link database.

7. The method of claim 3, wherein the at least one resource is a suspicious file.

8. The method of claim 7, wherein each one from the list of predetermined filenames is obtained using filename masks.

9. The method of claim 8, wherein the list of predetermined filenames is stored in at least one of a file name database, in a folder name database, and in a URL link database.

10. The method of claim 1 wherein the accessing the event log of the targeted web server is executed by one of:

transferring the event log of the targeted web server to the web server; and gaining remote access to the event log of the targeted web server.

* * * * *